United States Patent [19]

Feinberg

[11] Patent Number: 5,118,746

[45] Date of Patent: Jun. 2, 1992

[54] FIRE RETARDANT MELT STABLE ETHYLENE/CARBOXYLIC ACID COPOLYMER COMPOSITION

[75] Inventor: Stewart C. Feinberg, Exton, Pa.

[73] Assignee: E. I. du Pont de Nemours and Company, Wilmington, Del.

[21] Appl. No.: 654,132

[22] Filed: Feb. 11, 1991

[51] Int. Cl.⁵ .................................................. C08K 9/10
[52] U.S. Cl. ...................................... 524/411; 524/412
[58] Field of Search ................................ 524/411, 412

[56] References Cited

U.S. PATENT DOCUMENTS 4,343,854  8/1982  Moorman ............................ 524/466
4,992,486  2/1991  Feinberg ............................. 524/515

Primary Examiner—Paul R. Michl
Assistant Examiner—Umakant Rajguru

[57] ABSTRACT

A composition stabilized against thermal crosslinking and consequent reduction of its melt index, comprising a uniform dispersion of antimony oxide in a blend of a matrix polymer which is a dipolymer of ethylene with an ethylenically unsaturated carboxylic acid or a terpolymer of ethylene with an ethylenically unsaturated carboxylic acid and with another ethylenically unsaturated comonomer, carbon dioxide or sulfur dioxide; an organo-halogen fire-retardant; and a stabilizing polymer which is a high melt index copolymer of ethylene with acrylic or methacrylic acid. Such compositions are useful as adhesive layers in laminates used in packaging and building construction.

14 Claims, No Drawings

FIRE RETARDANT MELT STABLE ETHYLENE/CARBOXYLIC ACID COPOLYMER COMPOSITION

FIELD OF THE INVENTION

This invention relates to melt-stable blends of copolymers of ethylene with alpha,beta-unsaturated carboxylic acids, and an antimony oxide/organo-halogen fire retardant system. Such compositions are useful, i.a., as an adhesive layer in laminated structures used particularly in packaging of, for instance, electronic goods, or in laminated structures used in building construction, or any other areas where fire retardancy is needed.

BACKGROUND OF THE INVENTION

Ethylene copolymers with alpha,beta-unsaturated carboxylic acids are known to be very good hot melt adhesives suitable for bonding plastic to metal or to another plastic layer. However, when an -antimony oxide/organo-halogen system is incorporated into the ethylene/alpha,beta-unsaturated carboxylic acid copolymer, and the resulting fire-retarded copolymer is exposed to high temperatures, such, for example, as are encountered during extrusion (typically in the range from 200 to 280 deg. C.), the copolymer reacts with the antimony oxide as evidenced by a decrease of the polymer's melt index. Further reduction of melt index occurs on storage. Such lowering of the melt index is undesirable because it leads to more difficult and less uniform processing.

There is, therefore, a great need for a thermally stable fire-retardant ethylene/alpha,beta-unsaturated carboxylic acid copolymer composition.

SUMMARY OF THE INVENTION

According to this invention, there is provided a composition stabilized against thermal crosslinking and consequent decrease of its melt index, i.e., a melt-stable or fire retarded composition comprising a uniform dispersion of antimony oxide, optionally predispersed in a carrier polymer, in a blend of a matrix polymer, an organo-halogen fire-retardant, and a stabilizing polymer. More specifically, the subject invention is a composition comprising (i) a matrix polymer E/X/Y, where E is ethylene; X is a $C_3$-$C_7$ alpha,beta-unsaturated carboxylic acid; and Y is selected from the group consisting of C1-C10 alkyl esters of $C_3$-$C_7$ alpha,beta-unsaturated carboxylic acids, vinyl esters, vinyl ethers, acrylonitrile, methacrylonitrile, carbon monoxide, and sulfur dioxide; the respective relative weight ratios of the monomers in said E/X/Y copolymer being about 96:4:0 to 40:30:30, and the melt index of said copolymer being about 0.1-100 dg/min;

(ii) a stabilizing polymer of ethylene with an unsaturated carboxylic acid selected from the group consisting of acrylic acid and methacrylic acid having a melt index of at least about 5,000 dg/min, and containing at least about 5 weight percent of carboxylic acid monomer; and (iii) an antimony oxide/organo halogen fire retardant composition, the relative weight ratio of matrix polymer to stabilizing polymer being about 98:2 to 65:45, the amount of antimony oxide in the blend being about 2 to 20 total weight percent, and the amount of organo-halogen compound in the blend being from about 7 to 55 total weight percent.

DETAILED DESCRIPTION

The matrix polymer useful herein is a copolymer represented by the formula E/X/Y, where E is ethylene; X is a $C_3$-$C_7$ alpha,beta-unsaturated carboxylic acid or mixtures of such acids; and Y, which is optional, is a copolymerizable comonomer or a mixture of other copolymerizable comonomers selected from the group consisting of C1-C10 alkyl esters of $C_3$-$C_7$ alpha,beta-unsaturated carboxylic acids, vinyl esters, vinyl ethers, acrylonitrile, methacrylonitrile, carbon monoxide, and sulfur dioxide; wherein the respective relative weight ratios of the monomers in said E/X/Y copolymer is about 96:4:0 to 40:30:30, and the melt index of said copolymer, determined according to ASTM D1238, Condition E, is about 0.1-100 dg/min. Preferred matrix dipolymers are dipolymers of ethylene with methacrylic acid (X is methacrylic acid and Y is absent) and especially those in which the weight proportion of methacrylic acid is about 3-30%, preferably 4-15% by weight. Preferred matrix terpolymers are terpolymers of ethylene in which X is methacrylic acid and Y is vinyl acetate, n-butyl acrylate, or isobutyl acrylate.

The stabilizing polymer useful herein (also referred to herein as acid wax) is a high melt index copolymer of ethylene with an unsaturated carboxylic acid selected from the group consisting of acrylic acid (E/AA copolymer) and methacrylic acid (E/MAA copolymer), said high melt index copolymer having a melt index of at least about 5,000 dg/min, preferably at least 10,000 dg/min, determined according to ASTM D1238, condition E, and containing at least about 5 weight percent, preferably at least 9 weight percent, of carboxylic acid monomer. A minor amount of third monomer such as those described above for the matrix polymer can be present provided the appropriate M.I. level is retained. It is generally preferred to choose the type and amount of the stabilizing polymer such that the resulting initial melt index of the composition is close to the melt index of the matrix polymer itself. This objective can be approached with moderate amounts, 15% or less, of stabilizing polymer.

The relative weight ratio of matrix polymer to stabilizing polymer is about 98:2 to 65:35. The amount of stabilizing polymer is also dependent on the level of antimony oxide present, ranging from 1:10 to 10:1 stabilizing polymer:antimony oxide. The amount of antimony oxide in the blend is about 2 to 20 weight percent. The amount of the organo-halogen compound halogen source is about 6 to about 55 weight percent, preferably 10 to 30 weight percent. The optional carrier polymer in which antimony oxide may be predispersed is present up to about 30 weight percent of the combined weight of antimony oxide and carrier polymer. The level of the fire-retarding additives is dependent on the amount of fire-retardancy desired.

The composition may be further compounded to incorporate minor amounts of conventional additives such as, e.g., stabilizers, antioxidants, and slip improving agents. It can be additionally formulated with further additives such as, for example, plasticizers and supplemental fire retardants such as zinc borate, the total amount of plasticizers, if present, being no more than about 15 weight percent, but preferably 5-15 weight percent of the final composition, and the amount of supplemental fire-retardants, if present, being no more than 10 weight percent of the final composition.

The E/X/Y matrix copolymers suitable in the process of the present invention as defined above are available commercially or can be made according to known processes from readily available monomers. Copolymers of ethylene with unsaturated carboxylic acids are described in U.S. Pat. Nos. 4,351,931 to Armitage, 4,252,954 to Chatterjee, 3,264,272 to Rees, 3,520,861 to Thomson et al., 3,884,857 to Ballard et al., and 3,658,741 to Knutson et al. Terpolymers of ethylene with unsaturated carboxylic acids and with alkyl esters of unsaturated carboxylic acids are described in U.S. Pat. No. 3,264,272 to Rees; terpolymers of ethylene with carbon monoxide and unsaturated carboxylic acids are disclosed in U.S. Pat. No. 3,780,140 to Hammer, while terpolymers with sulfur dioxide and unsaturated carboxylic acids are described in U.S. Pat. No. 3,784,140 to Hammer. Various ethylene copolymers with methacrylic acid are sold by E. I. du Pont de Nemours and Company under the tradename NUCREL ®. Carboxylic acids, in addition to acrylic, methacrylic, and higher unsaturated monocarboxylic acids, also include monoesters of alpha,beta-unsaturated dicarboxylic acids such as, e.g., maleic, fumaric, and itaconic acids. Typical alkyl esters of alpha,beta-unsaturated carboxylic acids include methyl, ethyl, butyl, pentyl, hexyl, octyl, and decyl esters, both linear and branched, as well as diesters of dicarboxylic acids. The term matrix polymer can include mixtures of polymers as defined in this paragraph.

High melt index stabilizing copolymers as defined above are available, for example, from Allied Signal Corporation under the trademark A-C ® Copolymers (E/AA copolymers). Such copolymers also can be made according to known methods, e.g., according to similar known methods. They may be made according to the general disclosure of U.S. Pat. No. 3,264,272 to Rees.

Fire retardant systems which are based on the combination of antimony oxide and organo-halogen compounds are well known in the art. Typically the ratio of organo-halogen to antimony oxide is from 6:1 to 1:1, most preferably 4:1 to 2:1. Antimony oxide is available from several sources, including PPG Chemicals, Asarco, Harshaw and others. They may be in powder form, or may be predispersed in a minor amount of a carrier polymer. Predispersions of antimony oxide in a carrier polymer are increasingly used because antimony oxide itself has carcinogenic properties and carrier polymer prevents inhalation of antimony oxide dust. The carrier polymer may also aid in uniform dispersion of the antimony oxide, since it is already uniformly predispersed. Either may be used in the present invention, but predispered grades are preferred for health reasons. Typical of such predispersed grades, and a grade found highly suitable for use with the acid copolymers of the present invention is Fireshield, FSPO 405 which is a dispersion of antimony oxide in low density polyethylene manufactured by PPG chemicals. A listing of many grades of antimony oxide suitable in the present invention, both predispersed and not predispersed may be found in the Modern Plastics Encyclopedia. The polymer in which the antimony oxide may be predispersed is referred to herein as a carrier polymer. Such carrier polymers for antimony oxide may be present at levels of up to 30 weight percent of the antimony oxide/carrier polymer dispersion. In the final blends of the present invention, the carrier polymer will, if present, be no more than about 3 weight percent of the final composition.

The organo-halogen compound is a halogen source which reacts with antimony oxide. A large number of suitable organo-halogen compounds are available commercially, and include organo-bromine and organo-chlorine compounds. Such compounds are available from Saytech, Dow Chemicals, Ferro Corporation, Hooker, and many others. The most effective compound may vary depending on the exact nature of the polymer being flame retarded, but may be readily determined. Suitable brominated organic compounds include tetradecabromo diphenyoxyb,enzene available as Saytex 120, ethylene-bis(tetrabromophthalimide) available as Saytex BT 93 and pentabromoethyl benzene available as Saytex 105, all available from Saytech Corporation. Many other halogenated organic compounds may be suitable. A listing of such compounds is given in the Modern Plastics Encyclopoedia.

While the primary fire retardant system incorporated into the blends of this invention is a mixture of antimony oxide and an organo-halogen compound it is possible in addition to add various other fire-retardants to supplement the fire-retardant behavior of the blend. For instance, zinc borate is reputed to lessen the amount of antimony oxide required in an antimony oxide/organo-halogen system. Fire-retardancy is a complex property of a material, and other fire-retardants of varying kinds, added in relatively small amounts may have an advantageous effect on the overall fire-retardant behavior. Such additional fire-retardants are referred to herein as supplemental fire-retardants. They may include any of the many fire-retardant types commonly available. Lists of such materials are described in Modern Plastics Encyclopoedia.

In preparing blends of the stabilized fire-retarded polymers of this invention typical extrusion blending techniques may be used commercially, while for experimental quantities, various mixing devices are available, such as a Haake mixer. In the blends prepared in the examples, all ingredients - the matrix polymer or mix of matrix polymers, the stabilizing polymer, antimony oxide dispersion organo-halogen compound and any other additives were added to the blending equipment at the same time. It is possible, however, to prepare concentrates of various materials first, and then 'let-down' as required. Thus it is possible to prepare a concentrate of antimony oxide in the stabilizing polymer, or the stabilizing polymer in the matrix polymer and so forth. However, since it is common for health reasons to predisperse antimony oxide in a carrier polymer, the need to disperse powdery materials using the well known masterbatch techniques then becomes less important. Such 'Masterbatch' techniques are however useful in dealing with differing viscosities of polymeric components.

This invention is now illustrated by the following examples of certain preferred embodiments thereof, where all parts, proportions, and percentages are by weight unless otherwise indicated.

The antimony oxide used in all the examples was FSPO 405, an 80/20 blend of antimony oxide in low density polyethylene which is a product of PPG Chemicals.

The acid wax stabilizing polymer used in all examples was AC 143, an 82/18 by weight ethylene acrylic acid copolymer with a melt index of greater than 15000, available from Allied-Signal, Incorporated. This is one of many such acid waxes available. It has the preferred combination of high melt index and high acid content.

Small quantities of material, about 50 g, were melt-compounded using a Haake System 40 Mixer fitted with roller-blade rotors. Samples were prepared for this mixer by dry blending the various powders and pellets and charging the total slowly to the mixer. The compounds were mixed in the Haake mixer at the required temperature for 3 minutes at 15 RPM, then for 7 minutes at 50 RPM. Melt temperatures are shown in the Table II.

Larger quantities of dry blend were compounded on a Werner and Pfleiderer corotating twin screw extruder using either a 28 mm trilobal or a 30 mm bilobal screw configuration. The temperature profiles etc. used were as follows:

| 30 mm. Extruder | | | | | | |
|---|---|---|---|---|---|---|
| Zone #1 | Zone #2 | Zone #3 | Zone #4 | Die | RPM | Output |
| 130 | 180 | 230 | 275 | 275 | 250 | TM 15 pph |
| 28 mm. Extruder | | | | | | |
| Zone #1 | Zone #2 | Zone #3 | Zone #4 | Zone #5 | Die | RPM |
| 130 | 180 | 230 | 265 | 265 | 250 | 250 |

Temperatures are in degrees Celsius.

Melt index (MI) was determined, according to ASTM D1238, condition E, which requires a temperature of 190° C. and a 2,160 g weight.

Tables I describes the various matrix copolymers used in the course of the experimental work reported herein.

TABLE I

ETHYLENE/METHACRYLIC ACID MATRIX COPOLYMERS

|  | M1 | M2 | M3 |
|---|---|---|---|
| Acid Content (%) | 9.0 | 10.5 | 9.0 |
| Melt Index (dg/min) | 10 | 35 | 60 |

CONTROL EXAMPLES CT1 TO CT5 AND COMPARATIVE EXAMPLES C1 TO C5

Comparative examples C1 to C5 shown in Table II illustrate the large decrease in melt index which occurs when several different matrix copolymers are blended in a Haake mixer with antimony oxide and organo-bromine compounds. There is between a 50 and 100 fold decrease in melt index, indicating a strong reaction which suggests some form of crosslinking. By comparison, for control purposes, when the matrix polymers are blended under similar conditions with organo-bromine compounds alone, or with zinc borate (another commonly used fire retardant) the change in melt index is only a little over two fold, as seen in Control examples CT1 to CT5. When measured two weeks later, the melt index for these remains about the same.

TABLE II

BLENDS WITHOUT STABILIZER

| Example No. | Matrix. % | Org-Hal. % | % Sb$_2$O$_3$ | Other | Melt | MI. time |
|---|---|---|---|---|---|---|
| C1 | M1, 70 | S1, 22.5 | 7.5 | — | 280° C. | .26, init |
| C2 | M1, 50 | S2, 37.5 | 12.5 | — | 280° C. | .14, init |
| C3 | M3, 50 | S2, 37.5 | 12.5 | — | 280° C. | .28, init |
| C4 | M3, 50 | S1, 45 | 5.0 | — | 280° C. | .17, init |
| C5 | M2, 50 | S1, 45 | 5.0 | — | 280° C. | .37, init |
| CT1 | M1, 50 | S1, 50 | — | — | 280° C. | 3.9, init |
|  |  |  |  |  |  | 3.7, 2 wks |
| CT2 | M1, 70 | S1, 30 | — | — | 280° C. | 5.0, init |
|  |  |  |  |  |  | 5.5, 2 wks |
| CT3 | M1, 50 | S1, 37.5 | — | ZB, 12.5 | 280° C. | 3.4, init |
|  |  |  |  |  |  | 4.0, 2 wks |
| CT4 | M1, 70 | S1, 22.5 | — | ZB, 7.5 | 280° C. | 5.3, init |
|  |  |  |  |  |  | 6.9, 2 wks |
| CT5 | M1, 85 | S2, 15 | — | — | 200° C. | 11.1, init |
|  |  |  |  |  |  | 10.7, 2 wks |

S1. Saytex BT-93; S2, Saytex 120; ZB, Firebrake ZB zinc borate from U.S. Borax used as a supplemental fire retardant.
*% SB$_2$O$_3$ refers to weight percent of predispersed antimony oxide which is a dispersion of 80% antimony oxide in LDPE. The actual concentration based on pure antimony oxide is thus correspondingly lower

EXAMPLES 1 TO 9

The following examples illustrate the effectiveness of the acid wax stabilizer both in preventing a large reduction in melt index in the product as formed, and in the melt index of the product after standing for extended periods of time. In examples 1 to 3, the level of antimony oxide is 5% or below with a corresponding amount of organo-halogen compound within the preferred ratios as noted above. Example 1 has the lowest level of fire retardant and 10% stabilizer, and this shows the least reduction in melt index and excellent stability. Examples 2 and 3 with higher levels of fire retardants and lower levels of stabilizer show a greater reduction in melt index, but still not the drastic reduction seen in comparative examples C4 and C5. The melt index does not decrease further on standing for a prolonged time.

In examples 4 and 5 very high levels of both antimony oxide and total fire-retardant are used, a preferred embodiment, where very high levels of fire-retardancy is required. High levels of stabilizer are also used. It can be seen that the melt index measured initially after preparation of the material is reduced, but again, not to the same extent as in comparative examples C2 and C3 with high levels of flame retardant and no stabilizer. However, after standing, the reduction is mitigated somewhat.

Examples 6 to 9 show that if the melt temperature of mixing is kept lower, very effective stabilizing can be achieved, even to the point of being able to achieve viscosities close to the viscosity of the matrix copolymer (MI = 10). Of course, the problem is not as severe in the first place at this temperature, as illustrated by comparative example C6.

TABLE III
MELT STABILIZED BLENDS

| Example No. | Matrix, % | Org Hal, % | % Sb₂O₃ | % Stab | Prep Mode Melt Temp | MI, time |
|---|---|---|---|---|---|---|
| 1 | M1, 79.5 | S2, 8 | 2.5 | 10.0 | 28 mm Extr. 276° C. | 4.0, init<br>5.0, 2 wks |
| 2 | M1, 62.5 +<br>M2, 16.9 | S2, 15 | 3.8 | 1.8 | 28 mm Extr. 293° C. | 1.2, init<br>2.5, 2 wks<br>2.7, 2 mo |
| 3 | M1, 66.7 +<br>M2, 6.6 | S2, 15 | 5.0 | 6.7 | 28 mm Extr. 284° C. | 1.2, init<br>2.6, 2 wks<br>3.5, 2 mo |
| 4 | M2, 35 | S1, 40 | 10.0 | 15.0 | 30 mm Extr. 281° C. | 1.3, init<br>8.7, 2 wks<br>14.2, 2 mo |
| 5 | M2, 30 | S1, 50 | 10.0 | 10.0 | 28 mm Extr. 344° C. | 0.8, init<br>6.8, 2 wks<br>10.2, 2 mo |
| 6 | M1, 75 | S2, 15 | 5.0 | 5.0 | Haake 200° C. | 6.8, init<br>5.2, 2 wks |
| 7 | M1, 70 | S2, 15 | 5.0 | 10.0 | Haake 200° C. | 8.6, init<br>8.8, 2 wks |
| 8 | M1, 65 | S2, 15 | 5.0 | 15.0 | Haake 200 C. | 14.8, init<br>16.2, 2 wks |
| 9[1] | M1, 65 | S2, 10 | 5.0 | 15.0 | Haake 200°C. | 8.4, init<br>10.4, 2 wks |
| C9 | M1, 80 | S2, 15 | 5.0 | — | Haake 200° C. | 3.6, init<br>3.2, 2 wks |

S1, S2 same as Table II. % Sb₂O₃ same as Table II
[1] Composition 9 contains additionally 5 weight percent of a supplemental fire-retardant, Firebrake ZB, zinc borate manufactured by U.S. Borax Co.

I claim:

1. A composition comprising
(i) a matrix polymer E/X/Y, where E is ethylene; X is a $C_3$–$C_7$ alpha,beta-unsaturated carboxylic acid; and Y selected from the group consisting of $C_1$–$C_{10}$ alkyl esters of $C_3$–$C_7$ alpha,beta-unsaturated carboxylic acids, vinyl esters, vinyl ethers, acrylonitrile, methacrylonitrile, carbon monoxide, and sulfur dioxide; the respective relative weight ratios of the monomers in said E/X/Y copolymer being about 96:4:0 to 40:30:30, and the melt index of said copolymer being about 0.1–100 dg/min;
(ii) a stabilizing polymer of ethylene with an unsaturated carboxylic acid selected from the group consisting of acrylic acid and methacrylic acid having a melt index of at least about 5,000 dg/min, and containing at least about 5 weight percent of carboxylic acid monomer; and
(iii) an antimony oxide/organo halogen fire retardant composition, the relative weight ratio of matrix polymer to stabilizing polymer being about 98:2 to 65:45, the amount of antimony oxide in the blend being about 2 to 20 weight percent, and the amount of organo-halogen compound in the blend being from about 7 to 55 weight percent.

2. The composition of claim 1 wherein the melt index of the stabilizing copolymer is at least 10,000 dg/min.

3. The composition of claim 1 wherein the amount of carboxylic acid monomer in the stabilizing copolymer is at least 9 weight percent.

4. The composition of claim 2 wherein the amount of carboxylic acid monomer in the stabilizing copolymer is at least 9 weight percent 5. The composition of claim 1 which is further compounded to incorporate minor amounts of one or more additives selected from the group consisting of stabilizers, antioxidants, and slip improving agents.

6. The composition of claim 5 which is additionally formulated with one or more additives selected from the group consisting of plasticizers and supplemental fire-retardants, the total amount of plasticizers, if present,. being no more than about 15 weight percent of the final composition; and the amount of supplemental fire-retardant being from about 0 to 10 weight percent of the final composition.

7. The composition of claim 1 wherein the E/X/Y copolymer is a dipolymer of ethylene with methacrylic acid, wherein methacrylic acid is present in an amount of 3–30 weight percent, and Y is present in an amount of 0 weight percent.

8. The composition of claim 7 wherein the amount of methacrylic acid is 4–15 weight percent.

9. The composition of claim 2 wherein the E/X/Y copolymer is a dipolymer of ethylene with methacrylic acid, wherein methacrylic acid is present in an amount of 3–30 weight percent, and Y is present in an amount of 0 weight percent.

10. The composition of claim 9 wherein the amount of methacrylic acid is 4–15 weight percent.

11. The composition of claim 1 wherein the E/X/Y copolymer is a dipolymer of ethylene with acrylic acid, wherein acrylic acid is present in an amount of 3–30 weight percent, and Y is present in an amount of 0 weight percent.

12. The composition of claim 1 wherein the E/X/Y copolymer is a terpolymer of ethylene in which X is methacrylic acid, and Y is selected from the group consisting of vinyl acetate, n-butyl acrylate, and isobutyl acrylate.

13. The composition of claim 1 wherein the E/X/Y copolymer is a terpolymer of ethylene in which X is acrylic acid, and Y is selected from the group consisting of vinyl acetate, n-butyl acrylate, and isobutyl acrylate.

14. The composition of claim 1 wherein the antimony oxide is predispersed in a carrier polymer present in up to 30 weight percent based on antimony oxide plus carrier polymer.

* * * * *